United States Patent [19]

Itoh et al.

[11] Patent Number: 4,814,408

[45] Date of Patent: Mar. 21, 1989

[54] SELF-ADHERING SILICONE COMPOSITION

[75] Inventors: Kunio Itoh; Masaharu Takahashi; Kenichi Takita; Takeo Yoshida, all of Annaka, Japan

[73] Assignee: Shin-Etsu Chemical Co., Ltd., Tokyo, Japan

[21] Appl. No.: 155,026

[22] Filed: Feb. 11, 1988

[30] Foreign Application Priority Data

Feb. 13, 1987 [JP] Japan .................................. 62-31133

[51] Int. Cl.$^4$ ............................................. C08G 77/06
[52] U.S. Cl. ....................................... 528/24; 528/34; 525/474; 525/477
[58] Field of Search ................... 528/24, 34; 525/474, 525/477

[56] References Cited

U.S. PATENT DOCUMENTS 4,743,671 5/1988 Dorn et al. ............................ 528/24
4,755,554 7/1988 Itoh et al. .............................. 528/24

FOREIGN PATENT DOCUMENTS 56-39817 9/1981 Japan .
60-24973 2/1985 Japan .

*Primary Examiner*—Melvyn I. Marquis
*Attorney, Agent, or Firm*—Foley & Lardner, Schwartz, Jeffery, Schwaab, Mack, Blumenthal & Evans

[57] ABSTRACT

A self-adhering silicone composition comprising;
(A) 100 parts by weight of an organopolysiloxane
(B) 0.01 to 10 parts by weight of an organic peroxide represented by the formula (II):

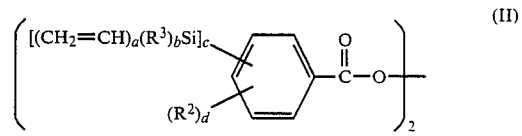

wherein $R^2$ represents a hydrogen atom, an alkyl group or alkoxy group having 1 to 10 carbon atoms; $R^3$ represents an alkyl group having 1 to 10 carbon atoms or a phenyl group; a is an integer of 1 to 3 and b is an integer of 0 to 2, provided that $a+b=3$; and c is an integer of 1 to 3 and d is an integer of 0 to 2, provided that $1 \leq c+d \leq 5$.

This composition can bring about strong and durable adhesion to substrates without use of any primers.

10 Claims, No Drawings

SELF-ADHERING SILICONE COMPOSITION

BACKGROUND OF THE INVENTION

1. Field of the Invention

This invention relates to a self-adhering silicone composition, and, more particularly, to a self-adhering silicone composition that can achieve strong adhesion with superior durability.

2. Description of Prior Art

When a silicone rubber composition, which usually has release properties, is adhered on metals or adhered on materials such as glass, ceramics, plastics, synthetic or natural fibers and rubbers under usual vulcanizing conditions, it is usually practiced to previously subject the surfaces of these substrates to a treatment by a primer, and thereafter to apply the composition to these substrates, followed by vulcanizing. However, the employment of a step of the primer treatment in a molding process makes the process complicated. Also, since the primer is usually used as a solution of organic solvents, it is required to install an equipment for exhausting the organic solvents evaporating in the molding process, or there are problems of safety and sanitation, such that workers may inhale or cutaneously respire the gas of organic solvents to cause diseases of viscera. Moreover, under the molding conditions in which a strong shear force is applied as in injection molding, there is a problem that a layer of the primer is flowed out or peeled. Thus, sought after is a silicone rubber composition having a self-adhering property and requiring no primer treatment.

Conventionally known as such a self-adhering silicone rubber composition are, for example, silicone rubber compositions in which peroxysilanes such as vinyltris(t-butylperoxy)silane, triphenyl(t-butylperoxy)silane, trimethyl(t-butylperoxy)silane, methylvinyl-di(t-butylperoxy)silane have been added as a component for imparting adhesion properties (Japanese Unexamined Patent Publication (KOKAI) No. 24973/1985), and silicone rubber compositions in which silane coupling agents such as vinyl trimethoxysilane, vinyl triethoxysilane, γ-glycidoxypropyl trimethoxysilane, γ-methacryloxypropyl trimethoxysilane have been added (Japanese Examined Patent Publication (KOKOKU) No. 39817/1981).

These self-adhering silicone rubber compositions in which the peroxysilanes have been added, however, have insufficiency in adhesion properties. Those in which the silane coupling agents have been added have also the problem that they have insufficiency in adhesion properties and adhesion durability.

SUMMARY OF THE INVENTION

Accordingly, an object of this invention is to provide a self-adhering silicone composition that can bring about strong and durable adhesion to various substrates.

To solve the above problems, this invention provides a self-adhering silicone composition as described below.

Thus, this invention provides a self-adhering silicone composition comprising:

(A) 100 parts by weight of an organopolysiloxane represented by the general unit formula (I):

$$(R^1)_z SiO_{(4-z)/2} \quad (I)$$

wherein $R^1$ represents a substituted or unsubstituted monovalent hydrocarbon group having 1 to 10 carbon atoms or admixtures thereof; and z is a number of 1.98 to 2.01, and having a viscosity of at least 300 cSt at 25° C.; and (B) 0.01 to 10 parts by weight of an organic peroxide represented by the formula (II):

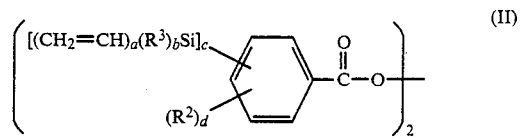

wherein $R^2$ represents a hydrogen atom, an alkyl group or alkoxy group having 1 to 10 carbon atoms; $R^3$ represents an alkyl group having 1 to 10 carbon atoms or a phenyl group; a is an integer of 1 to 3 and b is an integer of 0 to 2, provided that $a+b=3$; and c is an integer of 1 to 3 and d is an integer of 0 to 2, provided that $1 \leq c+d \leq 5$.

The self-adhering silicone composition of this invention can bring about strong and durable adhesion to substrates, and also has excellency in the properties such as hardness, tensile strength and elongation. Moreover, because of no need of primer treatment, the curing and adhering process can be simplified advantageously.

DESCRIPTION OF THE PREFERRED EMBODIMENTS

In the general unit formula (I) representing the organopolysiloxane of Component (A) constituting the composition of this invention, the substituted or unsubstituted hydrocarbon group represented by $R^1$ may include, for example, alkyl groups such as methyl, ethyl, propyl and butyl group, alkenyl groups such as vinyl and allyl group, aryl groups such as a phenyl group and a tolyl group, cycloalkyl groups such as a cyclohexyl group, and hydrocarbon groups in which a part or all of the hydrogen atoms bonded to carbon atom(s) of these groups is/are substituted, for example, with one or more of halogen atoms such as fluorine atom, chlorine atom and bromine atom, cyano group, etc. Examples of such a substituted hydrocarbon group may include chloromethyl group, trifluoropropyl group, cyanomethyl group, etc. Of these substituted or unsubstituted monovalent hydrocarbon groups, preferred are methyl group, ethyl group, a phenyl group, γ-trifluoropropyl group, cyanoethyl group, vinyl group, allyl group, etc.

In component (A) of the composition of this invention, 50 mol % or more in all of the groups represented by $R^1$ contained in the molecule may preferably be comprised of methyl group, and more preferably 80 mol % or more may be comprised of methyl group. If the methyl group comprises less than 50 mol % in all of the groups represented by $R^1$, the properties inherent in methylpolysiloxane may be impaired, or the cost for materials may become higher, with a disadvantage also for the production cost of the composition.

In the general unit formula (I), z is 1.98 to 2.01, and the organopolysiloxane of Component (A) is substantially a linear polymer.

The organopolysiloxane of Component (A) may preferably have a viscosity of 300 cSt or more, more preferably from $1 \times 10^4$ to $1 \times 10^8$ cSt, at 25° C. The viscosity less than 300 cSt may result in insufficient mechanical strength of the composition after adhesion, with no goodness for any practical use.

The organopolysiloxane of Component (A) can be prepared by a known method in which a cyclic polysiloxane well known as an oligomer is subjected to ring-opening polymerization in the presence of an acid or alkali catalyst.

In the formula (II) representing the organic peroxide of Component (B) constituting the composition of this invention, the alkyl group represented by $R^2$ may include, for example, methyl, ethyl, propyl, and the like, and the alkoxy group represented by $R^2$ may include, for example, methoxy, ethoxy, propoxy, butoxy group and the like. Of these alkyl groups and alkoxy groups, preferred as $R^2$ are methyl, ethyl, methoxy and ethoxy groups, and particularly preferred is methyl group.

The alkyl group represented by $R^3$ may include, for example, methyl, ethyl, propyl, butyl and the like, and the aryl group represents by $R^3$ may include, for example, a phenyl group, and the like. Of these groups represented by $R^3$, preferred is methyl group.

In the formula (II), a is an integer of 1 to 3 and b is an integer of 0 to 2, provided that $a+b=3$. Also, c is an integer of 1 to 3 and d is an integer of 0 to 2, provided that $1 \leq c+d \leq 5$, preferably $1 \leq c+d \leq 3$.

Preferable examples of the organic peroxides of Component (B) may include 4,4'-bis(vinyldimethylsilyl)-benzoyl peroxide, 4,4'-bis(divinylmethylsilyl)benzoyl peroxide, 2,2',4,4'-tetrakis(vinyldimethylsilyl)benzoyl peroxide, 2,2'-dimethyl-4,4'-bis(vinyldimethylsilyl)-benzoyl peroxide, 2,2',6,6'-tetramethyl-4,4'-bis(vinyldimethylsilyl)benzoyl peroxide, 3,3',5,5'-tetrakis(-vinylidimethylsilyl)benzoyl peroxide, 2,2'-diethyl-4,4'-bis(vinyldimethylsilyl)benzoyl peroxide, 4,4'-bis(vinyldiethylsilyl)benzoyl peroxide, 4,4'-bis(divinylethylsilyl)benzoyl peroxide, and the like. Of these, more preferred compounds are 4,4'-bis(vinyldimethylsilyl)-benzoyl peroxide, 2,2'-dimethyl-4,4'-bis(vinyldimethylsilyl)benzoyl peroxide, 4,4'-bis(divinylmethylsilyl)benzoyl peroxide.

Component (B) is required to be compounded in an amount ranging between 0.01 part by weight and 10 parts by weight, preferably between 0.3 part by weight and 10 parts by weight based on 100 parts by weight of Component (A) described above. The compounding of Component (B) in an amount less than 0.01 part by weight may result in no sufficient adhesion attained, and also no sufficient vulcanization achieved. The amount more than 10 parts by weight may cause a lowering of the properties such as tensile strength, elongation, thermal resistance, etc. of a resulting cured product.

This organic peroxide of Component (B) can be obtained by reacting 2 mols of a substituted benzoyl monochloride represented by the formula:

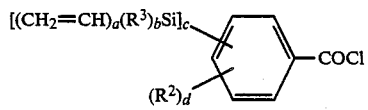

with 1 mol of a peroxide in the presence of a deacidifying agent such as sodium hydroxide, potassium hydroxide or pyridine, following, for example, the reaction scheme shown below.

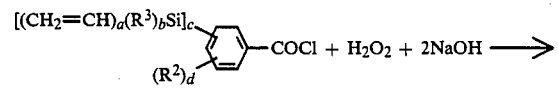

-continued

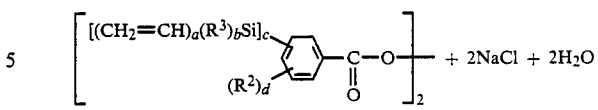

In addition to the above components (A) and (B), other organic peroxides can be optionally used in the composition of this invention so long as the resulting cured product may not damage required performances, for the purpose of controlling the vulcanization degree of the composition of this invention. Such organic peroxides may include, for example, benzoyl peroxide, 2,2',4,4'-tetrachlorobenzoyl peroxide, di-t-butyl peroxide, dicumyl peroxide, t-butyl perbenzoate, t-butyl peracetate, 2,5-dimethyl-2,5-ditert-butyl peroxyhexane, t-butylperoxymyristyl carbonate, and the like.

In the composition of this invention, a variety of finely particulate or fibrous fillers can be optionally compounded so long as the effect of this invention may not be impaired, for the purpose of increasing the viscosity before curing, for the purpose of improving the workability, or for the purpose of improving the mechanical properties such as hardness, tensile strength, elongation, etc. or improving the adhesion strength after curing. The fillers that can be used may include fumed silica, precipitated silica, quartz powder, diatomaceous earth, hollow glass beads, iron oxide, zinc oxide, titanium oxide, magnesium oxide, talc, aluminum silicate, alumina, calcium carbonate, carbon black, asbestos, glass fiber, carbon fiber, polyester fiber, polytetrafluoroethylene powder, polyvinyl chloride powder, etc.

To the composition of this invention, there can be further added and mixed conventionally known modifiers depending on what it is used for. For example, there can be mixed various sorts of silane coupling agents such as γ-glycidoxypropyl trimethoxysilane, γ-mercaptopropyl trimethoxysilane, γ-aminopropyl trimethoxysilane and vinyl trialkoxysilane, metal salts of organic carboxylic acids, titanic acid esters, chloroplatinic acid, heat-resisting agents, flame retardants, organic solvents, dispersants, etc.

Using the composition of this invention, a cured product can be readily obtained in the form of rubber or resin by appropriately controlling the proportion of the respective components described above.

The composition of this invention, thus obtained, may be brought into contact with surfaces of substrates made of materials of different types, for example, surfaces of metals, plastics, rubber, glass, etc., and thereafter heated to a temperature higher than the decomposition temperature of the organic peroxide of Component (B), usually about 100° to 500° C., to thereby effect cross-linking, so that desired silicone rubber or silicone resin is formed and at the same time uniformly and strongly adhered to the substrate surfaces.

In the conventional adhesion techniques, i.e., the process in which the primer treatment is carried out and the process in which a conventional self-adhering rubber composition is used, compositions are required to be vulcanized under the condition of 150° C. or more in order to attain a good adhesion, and therefore there has been a limitation in using plastics as the substrates. However, the composition of this invention, which has a feature that it can be vulcanized at a lower temperature of from 100° to 130° C., can be well applied to the substrates such as plastics.

The above substrates made of materials of different types may include metals such as iron, aluminum, stainless steel, nickel, copper and chromium, glass, quartz, ceramics, resins such as epoxy resin, acrylic resin, polyethylene terephthalate resin, unsaturated polyester resin, polyamide resin and polystyrene terephthalate resin, various sorts of synthetic fibers, natural fibers, inorganic fibers such as glass fiber, natural rubbers, synthetic rubbers, etc.

The composition of this invention, having the features as mentioned above, is useful as an adhesive sealing material, covering material, packaging material, injecting agent, impregnating agent, etc. that are strong and have durability.

EXAMPLES

This invention will be described below in greater detail by way of Examples. In the following, "part(s)" refers to part(s) by weight.

EXAMPLE 1

To 100 parts of methylvinylpolysiloxane comprising 99.8 mol % of dimethylsiloxane units and 0.2 mol % of vinylmethylsiloxane units and having a viscosity of 5,000,000 cSt at 25° C., added were 40 parts of hydrophobic fumed silica having a specific surface area of 200 $m^2/g$, and these were mixed by means of a kneader mixer until the mixture turned homogeneous. The mixture thus obtained is herein called Mixture (A). To 100 parts of this Mixture (A), added and mixed were 1.5 parts of silicone oil paste containing 50% of 4,4'-bis(vinyldimethylsilyl)benzoyl peroxide. The resulting mixture was placed on various plate-like substrates and inserted to molds to effect adhesion by compression for 10 minutes at 165° C. under a pressure of 20 $kgf/cm^2$. As a result, there were obtained specimens having a sufficiently vulcanized rubber film of 3.2 mm in thickness. After cooling to room temperature, according to the method prescribed in JIS K 6301, each of the adhered rubber films was subjected to tests for measuring the force necessary for peeling the rubber by pulling it in the direction right-angled to the substrate surface (i.e., adhesion strength). Results obtained are shown in Table 1.

TABLE 1

| Substrate | Adhesion strength ($kgf/cm^2$) |
|---|---|
| Stainless steel | 8.0 |
| Iron | 7.4 |
| Polyester resin | 9.5 |
| Glass fiber reinforced expoxy resin | 7.2 |

EXAMPLE 2

To 100 parts of Mixture (A) obtained in Example 1, added and mixed were 0.5 part of silicone oil paste containing 50% of 4,4'-bis(vinyldimethylsilyl)benzoyl peroxide and 1.0 part of silicone oil paste containing 50% of 2,2',4,4'-tetrachlorobenzoyl peroxide.

The resulting mixture was placed on a stainless steel plate and inserted to a mold to effect adhesion by compression and vulcanization for 10 minutes at 165° C. under a pressure of 20 $kgf/cm^2$.

The adhesion strength was measured in the same manner as in Example 1.

The measurement for the hardness, tensile strength and elongation of the cured rubbers obtained in Examples 1 and 2 was also carried out based on the method prescribed in JIS K 6301. Results obtained are shown in Table 2.

TABLE 2

|  | Example 1 | Example 2 |
|---|---|---|
| Adhesion strength ($kgf/cm^2$) | 8.0 | 7.7 |
| Hardness | 50 | 52 |
| Tensile strength ($kgf/cm^2$) | 102 | 98 |
| Elongation (%) | 450 | 390 |

In 100 parts of dimethylpolysiloxane terminated with trimethylsilyl groups and having a viscosity of 1,000,000 cSt at 25° C., 40 parts of precipitated silica having a specific surface area of 300 $m^2/g$ and 3 parts of dimethyldimethoxysilane as a dispersant were mixed by means of a kneader, and subjected to heat treatment for 2 hours at 160° C. To this mixture, mixed were 2.0 part of silicone oil paste containing 50% of 2,2'-dimethyl-4,4'-bis(divinylmethylsilyl)benzoyl peroxide, and the resulting mixture was vulcanized and adhered in the same manner as in Example 1, using a stainless steel plate as a substrate. The adhesion strength was measured in the same manner as in Example 1 to be satisfactory as being 8.3 $kgf/cm^2$.

EXAMPLES 4, 5 AND 6

To 100 parts of methylvinylsiloxane comprising 99.8 mol % of dimethylsiloxane units and 0.2 mol % of vinylmethylsiloxane units and having a viscosity of 5,000,000 cSt at 25° C., added were 40 parts of hydrophobic fumed silica having a specific surface area of 100 $m^2/g$, and these were mixed by means of a kneader mixer until the mixture turned homogeneous. To 100 parts of this mixture, compounded was a vulcanizing agent in the proportion as shown in Table 3, and the resulting composition was vulcanized and adhered in the same manner as in Example 1, using a stainless steel plate as a substrate. Results obtained by carrying out the tests in the same manner as in Example 1 are satisfactory and are as shown in Table 3.

TABLE 3

|  | Examples | | |
|---|---|---|---|
|  | 4 | 5 | 6 |
| Mixture | 100 | 100 | 100 |
| 4,4'-bis(vinyldimethylsilyl)-benzoyl peroxide(as 50% silicone oil paste) | 0.02 | 3 | 8 |
| 2,2',4,4'-tetrachlorobenzoyl peroxide (as 50% silicone oil paste) | 1.2 | — | — |
| Adhesion strength (stainless steel)($kgf/cm^2$) | 7.7 | 8.2 | 8.0 |
| Hardness | 50 | 48 | 53 |
| Tensile strength ($kgf/cm^2$) | 110 | 103 | 93 |
| Elongation (%) | 430 | 410 | 350 |

COMPARATIVE EXAMPLES 1, 2 AND 3

To 100 parts of this Mixture (A) obtained in Exmaple 1, added and mixed in an amount as shown in Table 4 was silicone oil paste containing 50% of 4,4'-bis(vinyldimethylsilyl)benzoyl peroxide.

The resulting composition was vulcanized and adhered in the same manner as in Example 1, using a stainless steel plate as a substrate. Results obtained by carrying out the tests in the same manner as in Example 1 are as shown in Table 4, and they were all unsatisfactory.

TABLE 4

|  | Comparative examples | | |
|---|---|---|---|
|  | 1 | 2 | 3 |
| Mixture (A)(parts) | 100 | 100 | 100 |
| 4,4'-bis(vinyldimethylsilyl)benzoyl peroxide (as 50% silicone oil paste) (parts) | 0.01 | 15 | — |
| 2,2',4,4'-tetrachlorobenzoyl peroxide (as 50% silicone oil paste)(parts) | — | — | 2 |
| Adhesion strength (stainless steel) (kgf/cm$^2$) | 2.5 | 6.3 | 0 |
| Hardness | 15 | 52 | 50 |
| Tensile strength (kgf/cm$^2$) | 13 | 65 | 115 |
| Elongation (%) | 520 | 140 | 420 |

What is claimed is:

1. A self-adhering silicone composition comprising;
   (A) 100 parts by weight of an organopolysiloxane represented by the general unit formula (I):

$$(R^1)_z SiO_{(4-z)/2} \quad (I)$$

wherein $R^1$ represents a substituted or unsubstituted monovalent hydrocarbon group having 1 to 10 carbon atoms or admixtures thereof; and z is a number of 1.98 to 2.01 and having a viscosity of at least 300 cSt at 25° C.; and
   (B) 0.01 to 10 parts by weight of an organic peroxide represented by the formula (II):

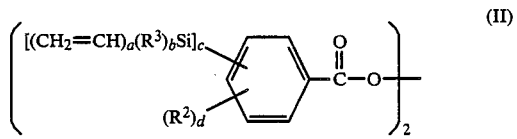

wherein $R^2$ represents a hydrogen atom, an alkyl group or alkoxy group having 1 to 10 carbon atoms; $R^3$ represents an alkyl group having 1 to 10 carbon atoms or a phenyl group; a is an integer of 1 to 3 and b is an integer of 0 to 2, provided that a+b=3; and c is an integer of 1 to 3 and d is an integer of 0 to 2, provided that $1 \leq c+d \leq 5$.

2. The composition according to claim 1, wherein $R^1$ in the formula (I) is selected from the group consisting of methyl, ethyl, phenyl, γ-trifluoropropyl, cyanoethyl group, vinyl and allyl group.

3. The composition according to claim 2, wherein 50 mol % or more of all the groups represented by $R^1$ in the formula (I) comprise methyl groups.

4. The composition according to claim 3, wherein 80 mol % or more of all the groups represented by $R^1$ in the formula (I) comprise methyl groups.

5. The composition according to claim 1, wherein the organopolysiloxane of Component (A) has a viscosity of from $1 \times 10^4$ to $1 \times 10^8$ cSt at 25° C.

6. The composition according to claim 1, wherein $R^2$ in the general formula (II) is selected from the group consisting of methyl, ethyl, methoxyl and ethoxyl groups.

7. The composition according to claim 1, wherein $R^3$ in the general formula (II) is methyl group.

8. The composition according to claim 1, wherein the organic peroxide of Component (B) is selected from the group consisting of 4,4'-bis(vinyldimethylsilyl)benzoyl peroxide, 4,4'-bis(divinylmethylsilyl)benzoyl peroxide, 2,2',4,4'-tetrakis(vinyldimethylsilyl)benzoyl peroxide, 2,2'-dimethyl-4,4'-bis(vinyldimethylsilyl)benzoyl peroxide, 2,2',6,6'-tetramethyl-4,4'-bis(vinyldimethylsilyl)benzoyl peroxide, 3,3',5,5'-tetrakis(vinyldimethylsilyl)benzoyl peroxide, 2,2'-diethyl-4,4'-bis(vinyldimethylsilyl)benzoyl peroxide, 4,4'-bis(vinyldiethylsilyl)benzoyl peroxide, and 4,4'-bis(divinylethylsilyl)benzoyl peroxide.

9. The composition according to claim 8, wherein the organic peroxide of Component (B) is selected from the group consisting of 4,4'-bis(vinyldimethylsilyl)benzoyl peroxide, 2,2'-dimethyl-4,4'-bis(vinyldimethylsilyl)benzoyl peroxide, and 4,4'-bis(divinylmethylsilyl)benzoyl peroxide.

10. The composition according to claim 1, comprising 0.3 to 10 parts by weight of Component (B) per 100 parts by weight of Component (A).

* * * * *